United States Patent
Wilder et al.

(10) Patent No.: US 12,532,871 B2
(45) Date of Patent: Jan. 27, 2026

(54) TAGGING AND CULLING SYSTEM FOR FISHING

(71) Applicant: Dobyns Rods, Sulphur Springs, TX (US)

(72) Inventors: Daniel Paul Wilder, Yuba City, CA (US); Gary Wayne Dobyns, Sulphur Springs, TX (US)

(73) Assignee: Dobyns Rods, Sulphur Springs, TX (US)

( * ) Notice: Subject to any disclaimer, the term of this patent is extended or adjusted under 35 U.S.C. 154(b) by 1231 days.

(21) Appl. No.: 17/189,938

(22) Filed: Mar. 2, 2021

(65) Prior Publication Data

US 2022/0279766 A1 Sep. 8, 2022

(51) Int. Cl.
*A01K 61/90* (2017.01)

(52) U.S. Cl.
CPC .................... *A01K 61/90* (2017.01)

(58) Field of Classification Search
CPC ..................................... A01K 61/90
See application file for complete search history.

(56) References Cited

U.S. PATENT DOCUMENTS

| 8,738,322 | B1 * | 5/2014 | Gioffre, II | G01G 5/02 |
| | | | | 702/173 |
| 2003/0127253 | A1 * | 7/2003 | Heyn | G01G 19/60 |
| | | | | 177/148 |
| 2015/0317502 | A1 * | 11/2015 | Castaneda | A01K 99/00 |
| | | | | 340/5.1 |
| 2020/0275265 | A1 * | 8/2020 | Bansal | H04W 12/64 |

* cited by examiner

*Primary Examiner* — Jeffrey K Wong
(74) *Attorney, Agent, or Firm* — Shook, Hardy & Bacon L.L.P.

(57) ABSTRACT

Systems and methods for tagging, culling, or tagging and culling fish include various elements. For example, the systems and methods may be implemented on a scale for weighing fish and may maintain a pre-determined color order to suggest a next-up color for a cull tag. In addition, the pre-determined color order may be dynamically updated in real time to account for overrides by an angler or releasing of an already caught fish. In an additional aspect, the scale may have an integrated global positioning system (GPS) sensor to capture position information associated with the catch and used to pull other relevant information.

8 Claims, 7 Drawing Sheets

TAGGING AND CULLING SYSTEM FOR FISHING

TECHNICAL FIELD

This disclosure relates systems and methods for tagging and culling fish.

BACKGROUND

There are various situations in which fish are tagged and culled. For example, there may be a maximum limit to the number of fish an angler is allowed to retain (e.g., in a livewell), such as in a tournament situation or according to permit allowances. Once the maximum limit has been reached by a quantity of retained fished, if an angler catches another fish, the angler may decide to either release the newly caught fish (e.g., if it weighs less than each of the other retained fish) or retain the newly caught fish and release a previously caught fish that had been included in the quantity of fish. Often, an angler may desire to maximize the total weight of the fish included in the cull limit. For example, the angler might weigh the newly caught fish, and if the newly caught fish weighs less than each of the other retained fish, then the angler may release the newly caught fish. Or, if the newly caught fish weighs more than one of the previously caught retained fish, then the angler may release one of the previously caught fish that weighs the least.

Conventional approaches to fish culling (e.g., deciding which fish to release once a maximum limit is reached) include color-coding the fish using colored cull tags. For example, a fish placed in a livewell may be tagged with a uniquely colored cull tag, and a record may be kept of a weight associated with the color (e.g., blue—4.25; yellow 3.70). When a new fish is caught that weighs more than a fish in the livewell and the angler decides to release a fish from the livewell, the cull-color record can be referenced to determine which fish to release (e.g., the fish tagged with the yellow cull tag).

Conventional fishing scales weigh the fish and maintain a tag-color record. However, these conventional solutions fail to address and simplify some of the steps or operations executed when culling, and as such, may reduce organization and efficiency (e.g., in a tournament) where time is of the essence. For example, conventional solutions fail to align an angler on a next-up cull tag (e.g., which cull tag is "on deck"), which can cause confusion, disorganization, wasted time, and inefficiencies while fishing. In addition, once a color is selected by an angler for a cull tag, additional steps must be executed for the angler to assign the color to a catch and update the tag-color record, which increases time expenditure, processing load, and memory usage.

In addition to culling systems, other tools may be used by anglers. For example, global positioning system (GPS) data may be used to determine a location of a catch, which can be referenced in subsequent fishing activities or used to pull other information, such as weather at a particular location at the time of a catch. Conventional fishing scales may rely on non-scale, global positioning system (GPS) sensors that may be part of devices other than the scale (e.g., mobile device, fish-finder device, etc.). However, these non-scale GPS solutions require additional syncing and rely on other devices, both of which are subject to failure, increasing the likelihood of inaccurate or missing GPS data associated with a catch.

SUMMARY

This summary provides an overview of some subject matter of this disclosure and introduces a selection of concepts further described below in the detailed-description section. This summary is not intended to identify key features or essential features of the claimed subject matter, nor is it intended to be used as an aid in isolation to determine the scope of the claimed subject matter.

Embodiments of the present disclosure relate to a tagging and culling system for fishing. In one aspect, the system (e.g., implemented on a scale for weighing fish) includes systems and methods that maintain a pre-determined color order that may be used to suggest a next-up color for a cull tag. In addition, the pre-determined color order may be dynamically updated in real time to account for overrides by an angler or releasing of an already caught fish. As such, the system of the present disclosure may automatically provide a suggested cull-tag color, which may reduce processing resources, memory usage required to execute steps, and user error that may otherwise occur when manually updating a tag-color record as in conventional solutions.

In an additional aspect, the fish culling system includes a scale having an integrated global positioning system (GPS) sensor. As such, associating GPS data with a fish-catch record may occur more real time and reduce the likelihood of errors potentially arising from having to sync multiple devices and failure by other devices as in conventional approaches. In addition, inefficiencies, failures, and added complexities arising from managing and keeping track of multiple devices may be reduced.

BRIEF DESCRIPTION OF THE DRAWINGS

Subject matter described in this disclosure relates to systems and methods for tagging and culling fish and is described in detail below with reference to these briefly-described figures, each of which is incorporated by reference herein in its entirety.

DETAILED DESCRIPTION

Figure 1:
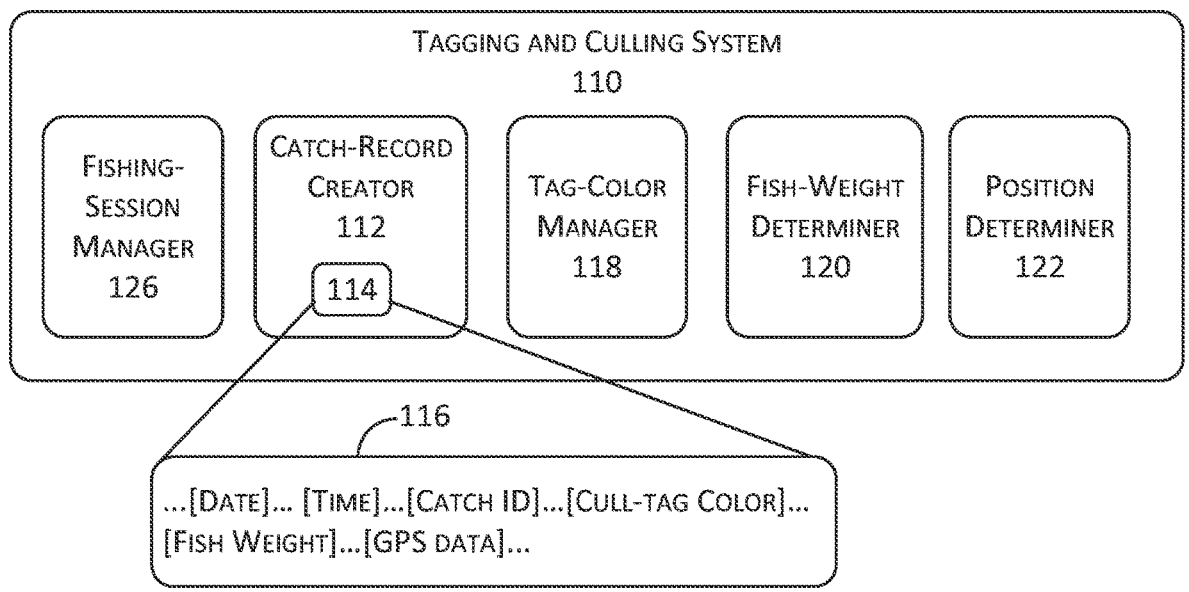
FIG. 1 is an illustration of a system for tagging and culling fish having various components, in accordance with some embodiments of the present disclosure.

Subject matter is described throughout this Specification in detail and with specificity in order to meet statutory requirements. The aspects described throughout this Specification are intended to be illustrative rather than restrictive, and the description itself is not intended necessarily to limit the scope of the claims. Rather, the claimed subject matter might be practiced in other ways to include different elements or combinations of elements that are equivalent to the ones described in this Specification and that are in conjunction with other present technologies or future technologies. Upon reading the present disclosure, alternative aspects may become apparent to ordinary skilled artisans that practice in areas relevant to the described aspects, without departing from the scope of this disclosure. It will be understood that certain features and subcombinations are of utility and may be employed without reference to other features and subcombinations. This is contemplated by, and is within the scope of, the claims.

The subject matter described in this Specification generally relates to, among other things, a system for tagging and culling fish that maintains and updates information as fish are caught. That is, an angler engages in a live fishing-session event (e.g., a tournament or fishing under a permit or license) and the system of the present disclosure stores information related to the fishing-session event as a fishing-session record. The fishing-session record may include various information, such as a date, name of body of water, fishing conditions, and maximum limit of fish. In addition, with each fish-catch event (e.g., angler catching a fish) occurring during the fishing-session event, the system may update the fishing-session record with a fish-catch record (e.g., time, GPS location, weight, and tag color).

The system may maintain and update each fish-catch record, as well as a group of fish-catch records associated with a fishing-session record. In one aspect, the system may maintain and update a list of each color-coded fish retained in a livewell (e.g., livewell color record). For example, when a fish is caught and retained (e.g., in a livewell), a unique color is assigned to the fish, and the livewell color record is updated to reflect that the fish attached to a cull tag having the unique color is retained in the livewell. In accordance with an aspect of the present disclosure, a pre-determined color order is maintained that may be used to suggest a next-up color for a cull tag. For example, when a fish is caught, the system may reference the pre-determined order to select a next-up, cull-tag color and present to an angler (e.g., via a graphical user interface, speaker, etc.) a suggestion to attach to the newly caught fish a cull tag having the next-up, cull-tag color. Among other things, this increases the accuracy of the cull-tag system by limiting human error and reduces computer resources that would otherwise be required to process steps for manually designating the cull-tag color for the newly caught fish.

In another aspect of the present disclosure, the system includes a scale having an integrated global positioning system (GPS) sensor. For example, the GPS sensor may be contained in the scale housing and integrated with other components of the scale that capture information related to a fish-catch record (e.g., fish weight). The integration of the GPS sensor with the scale may increase the likelihood that GPS data is stored together with a fish-catch record by reducing reliance on successful synchronization and on proper functioning by other devices discrete from the scale. In addition, integration of the GPS sensor with other components may allow obtaining position data at useful times, such as near simultaneously with weighing a fish. Moreover, the GPS data can be used to pull additional information associated with the catch, such as environmental conditions (e.g., temperature, wind speed, wind direction, atmospheric pressure, humidity, etc.).

Before describing the figures in more detail, some additional explanation will now be provided related to certain terminology that may be used in this disclosure.

"A," "an," "the," "at least one," and "one or more" might be used interchangeably to indicate that at least one of the items is present. When such terminology is used, a plurality of such items might be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Referring now to FIG. 1, FIG. 1 depicts a tagging and culling system 110 for tagging and culling fish in accordance with an aspect of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

In an aspect of the disclosure, the system 110 may include a fishing-session manager 126, which stores and updates information associated with a fishing-session event. For example, the fishing-session manager 126 may create a new fishing-session record for a given fishing-session event and store information related to the fishing-session event. That is, for analysis, tracking, and/or culling, the fishing-session manager 126 may compile information throughout a fishing-session event into a group of data referred to as a fishing-session record, and various metrics, statistics, and/or other data may be gleaned from a fishing-session record (e.g., number of catches, average fish weight, largest catch, smallest catch, catch rate, etc.). In addition, the fishing-session manager 126 may maintain and update a livewell color record and propose culling steps when a maximum limit has been reached.

In a further aspect, the system 110 may include a catch-record creator 112, which creates a new fish-catch record 114 when a fish is caught (e.g. fish-catch event) to store information (e.g., information or data 116) related to the fish or to the catch. In addition, the fish-culling system 110 includes a tag-color manager 118 for determining or suggesting a color of a cull tag to be associated with a fish-catch record 114 and for maintaining a color order. The fish-culling system 110 further includes a fish-weight determiner 120 (e.g., including a strain gauge or a load cell) to determine a fish weight for inclusion in the fish-catch record 114 and a position determiner 122 (e.g., including a GPS sensor) to determine a geographic position for inclusion in the fish-catch record 114.

The catch-record creator 112, the tag-color manager 118, the fish-weight determiner 120, and the position determiner 122 may be housed within a same device (e.g., scale with digital display) and integrally connected to communicate with one another. For example, the tag-color manager 118 may determine a color to be suggested for assignment to a fish (e.g., a next caught fish or the most recently caught fish) and communicate the color to the catch-record creator 112 for inclusion in the fish-catch record 114. Similarly, the fish-weight determiner 120 may communicate a fish weight to the catch-record creator 112, and the position determiner 122 may communicate a position to the catch-record creator 112. Moreover, communications may be exchanged between the tag-color manager 118, the fish-weight determiner 120, the position determiner 122, or any combination thereof.

The system 110 may be implemented in a variety of different computing devices. For example, in one aspect of the present disclosure, the system 110 is implemented in a scale for weighing fish, and the scale may include each of the components described with respect to FIG. 1. In addition, the scale may retain a fish to be weighed in various manners, such as by providing a platform or surface on which the fish may rest, providing a gripping mechanism from which the fish may suspend, and the like.

Figure 2:
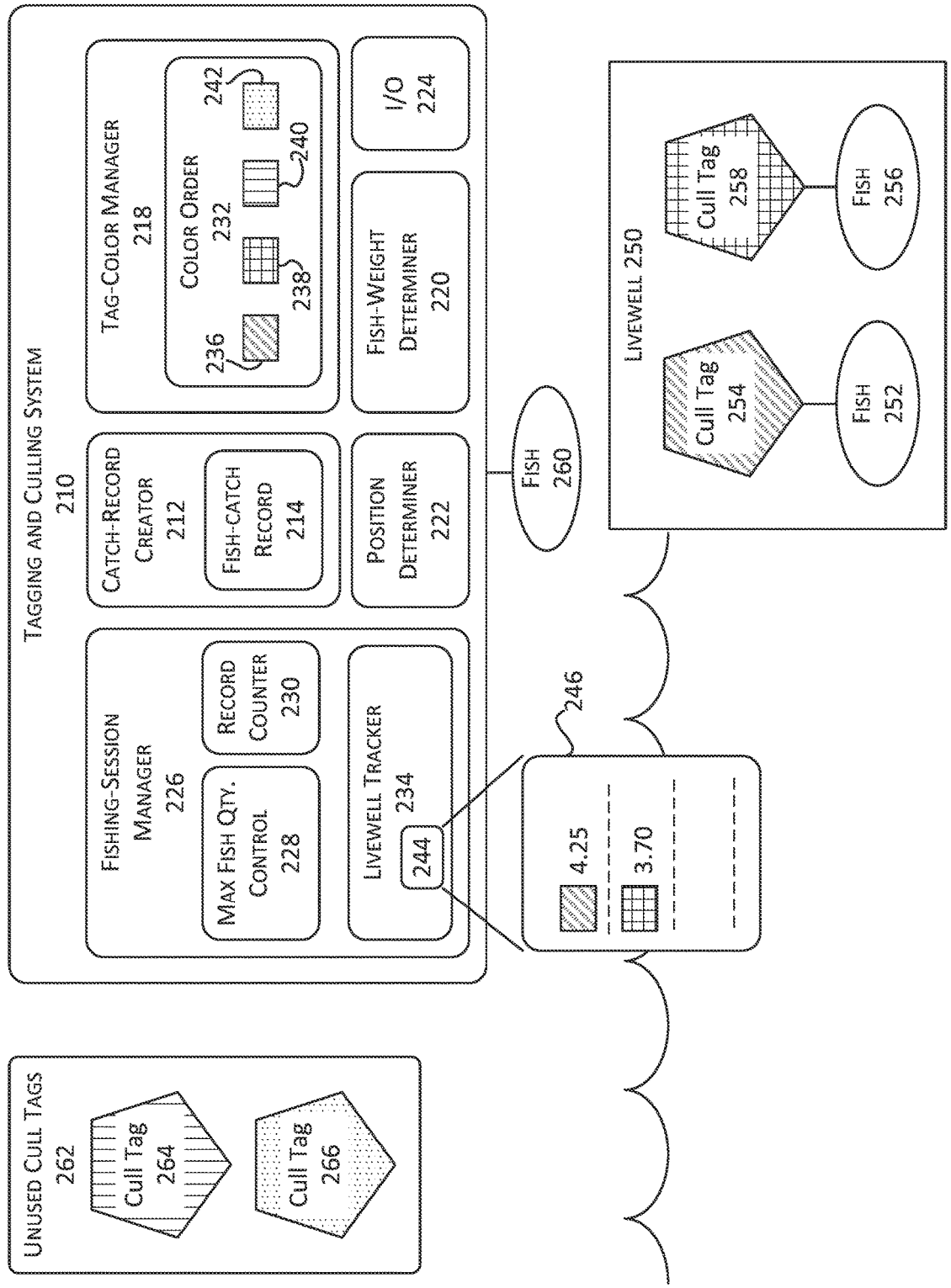
FIG. 2 is an illustration of another system for tagging and culling fish in a real-world context, including some fish retained in a livewell (e.g., on a boat) and some unused cull tags available to be used to tag a newly caught fish, in accordance with some embodiments of the present disclosure.

Referring now to FIG. 2, FIG. 2 illustrates a tagging and culling system 210 in a real-world context (e.g., being used on a boat by an angler catching fish). In addition to the tagging and culling system 210, FIG. 2 depicts a livewell 250 retaining a first fish 252 with a first cull tag 254 and a second fish 256 with a second cull tag 258. The first cull tag 254 and the second cull tag 258 include a different appearance (e.g., color) as illustrated by the different hatches. Upon catching a third fish 260, the fish-culling system 210 performs operations to assess how the fish 260 should be tagged, and if appropriate, what culling steps are recommended. For example, there may be a maximum fish limit that limits the number of fish the angler desires (or is allowed) to have in his or her livewell 250 or is allowed to submit or keep when participating in a tournament or when fishing with a permit. This maximum fish limit may be defined by a regulatory body that governs a permit granting the angler a license to fish in a particular area. In other instances, the maximum fish limit may be defined as part of a fishing tournament. As such, the system 210 may help determine whether to release the fish 260 or retain the fish 260 in the livewell 250 (e.g., based on weight when a maximum cull size has been met). In the event the angler wants to add the third fish 260 to the livewell 250, the angler may wish to apply a third cull tag having a different appearance from other cull tags attached to fish already in the livewell. As such, the fish-culling system 210 may suggest applying one of the unused cull tags 262, either the cull tag 264 or the cull tag 266, both of which have different appearances (e.g., colors) from each other and from the cull tags 252 and 256.

The system 210 may include components similar to the tagging and culling system 110, including a catch-record creator 212, a cull-color manager 218, a fish-weight determiner 220 (e.g., including a load cell), a position determiner 222 (e.g., including a GPS sensor), and a fishing-session manager 226. In addition, the system 210 may similarly be implemented in a variety of computing devices, including a scale. The system 210 may include more components, or fewer components, in other aspects of the disclosure. For example, in one aspect of the disclosure, the system 210 may include input/output (I/O) components 224 to receive information from an angler (or other user) and present information to the angler. Examples of I/O 224 may include, but not be limited to, a graphical user interface (GUI), a touchscreen, a keypad, a touchpad, a button, a speaker, a microphone, a light-emitting diode (LED), and the like. As described with respect to FIG. 1, any combination of the various components of the fish-culling system 210 may communicate with one another to exchange information.

In an aspect of the present disclosure, the fishing-session manager 226 may include a maximum fish quantity control 228 that stores one or more data values representative of a quantity of fish. For example, a tournament may set a tournament limit of a quantity of fish that may be considered when determining a total weight (e.g., five (5) fish) and the maximum fish quantity control 228 may store that tournament limit. The maximum fish quantity control 228 may include a default quantity (e.g., five). In other instances, the maximum fish quantity control 228 may receive an input via the I/O 224 to customize the quantity of fish. For example, using a touchscreen, an angler may enter the quantity of fish to be stored by the maximum fish quantity control 228, such as by entering information into a data field, selecting from a list of proposed quantities, etc.

In addition, the fishing-session manager 226 may include a record counter 230 that stores one or more data values representative of a quantity of fish-catch records (e.g., the fish-catch record 214) that have been created for a given fishing-session event and that are stored in association with a fishing-session record. For example, at the beginning of a fishing-session event (e.g., before any fish have been caught when the fishing-session record is initially created) the record counter 230 may be set to a first quantity (e.g., zero). During the fishing-session event, when a fish-catch record is created by the catch-record creator 212 (e.g., upon catching the fish 252, the fish 256, or the fish 260), the record counter 230 may be updated to a second quantity (e.g., the first quantity may be incremented to a second quantity). The record counter 230 may be updated to count all fish-catch records created during a fishing-session event. Alternatively, the record counter 230 may stop once a threshold has been reached (e.g., one more than the maximum fish limit). Although the maximum fish quantity control 228 and the record counter 230 are depicted as separate components, they may be combined into a single component, such as a configurable counter that is programmable to receive one or more customizable thresholds and to trigger some operation when a threshold is met.

The quantity of fish-catch records stored by the record counter 230 may be used for various purposes. For example, a quantity stored by the record counter 230 may be used to suggest a cull-tag color to be assigned to a newly caught fish. In one aspect of the disclosure, the tag-color manager 218 maintains a pre-determined color order 232, which includes a series of colors in a predetermined order (e.g., 1-red, 2-yellow, 3-blue, 4-organge, 5-white, 6-green, etc.). That is, each color among the colors in the predetermined order includes a respective position (e.g., $1^{st}$, $2^{nd}$, $3^{rd}$, $4^{th}$, $5^{th}$, $6^{th}$, etc.). In the illustration of FIG. 2, the $1^{st}$ position is assigned to a first color 236 visually represented by a diagonal hatch; the $2^{nd}$ position is assigned to a second color 238 visually represented by a grid hatch; the $3^{rd}$ position is assigned to a third color 240 visually represented by a vertical hatch; and the $4^{th}$ position is assigned to a fourth color 242 visually represented by a dot stipple. In an aspect of the disclosure, the tagging and culling system 210 may compare a quantity value stored by the record counter 230 (e.g., an updated quantity when a new fish is caught) to the pre-determined color order 232 to determine which color corresponds to the quantity value based on the position of the color.

Once a color is identified having a position corresponding to the quantity value of the record counter 230, the system 210 may provide an output (e.g., audible or visual via the I/O 224) suggesting the color. For example, the system 210 may audibly announce the color via a speaker, visibly display text of the name of the color via a display screen, emit a light having the same color as the identified color, or any combination thereof. In addition, the system 210 may update the fish-catch record 214 to include data representing the identified color, such as when a confirmation is received that the newly caught fish was tagged with a cull tag having the color and retained in the livewell 250.

In a further aspect, the fishing-session manager 226 includes a livewell tracker 234. Among other things, the livewell tracker 234 may store data values 244 representative of one or more fish, or a list of fish, currently retained (e.g., livewell color list 246) in the livewell 250. For example, when a fishing session is initiated, the livewell tracker 234 may store data 244 representing zero fish being retained in the livewell 250. As fish are caught, a fish-catch record for each fish may be created by the catch-record creator 212. Each fish-catch record may store data indicating a status of the fish, such as whether a fish is retained or whether a fish was released. In addition, once the fish-culling system 210 has received a confirmation (e.g., by an angler providing input via the I/O 224) that a cull tag having a color was applied to a fish and that the fish was retained in the livewell 250, the livewell tracker 234 may update the stored data 244 to include data representing at least the color of the cull tag of the fish retained in the livewell 250. For example, the catch-record creator 212 may communicate a change in status (e.g., "retained in livewell" or "released from livewell") to the fishing-session manager 226, which in turn may update a record of fish currently retained in the livewell 250 (e.g., the "livewell list"). The livewell tracker 234 may store other information, such as the weight of each fish retained in the livewell 250.

In addition to identifying a cull-tag color, the quantity of fish-catch records stored by the record counter 230 may be used for other purposes. For example, the fishing-session manager 226 may determine when the quantity of fish (e.g., tournament limit) stored by the maximum fish quantity control 228 has been exceeded by comparing the value stored by the record counter 230 to the value stored by the maximum fish quantity control 228. As indicated in other parts of this disclosure, the maximum fish quantity control 228 and the record counter 230 may be combined into a single component, such as a configurable counter that is programmable to receive one or more customizable thresholds and to trigger some operation when a threshold is met (e.g., a threshold equal to one more than the maximum cull size). Once the quantity stored by the maximum fish quantity control 228 has been exceeded, the system 210 may perform various operations. For example, in one aspect, the fishing-session manager 226 may compare the weight of a newly caught fish (e.g., as determined by the fish-weight determiner and communicated to the fish-catch record 214) to the weights of the other fish identified on the livewell color list 246. If the newly caught fish weighs more than any fish represented on the livewell color list 246, then the color of the fish having the lowest weight among all the fish in the livewell list is identified, and the system 210 may present an output (e.g., via I/O 224) suggesting that the fish having the cull tag with the identified color be released.

When a fish is released from the livewell, the tagging and culling system 210 may execute various operations to automatically and dynamically update a tagging scheme. In one aspect of this disclosure, the system 210 automatically updates the pre-determined color order 232 when a fish having a colored cull tag is released (e.g., when the fish-culling system 210 receives an input through the I/O 224 from a user indicating a fish having a colored cull tag is released). When a fish is released (e.g., when the system 210 receives the input indicating the release), a variety of different information related to the fish may be used to update the color order 232. In one example, the color of the cull tag that had been used to tag the fish may be identified (e.g., pulled from the fish-catch record 214 or from the livewell tracker 234) and communicated to the tag-color manager 218 as having been released. Upon receiving the color, the tag-color manager 218 may re-order the color order 232 by moving the color to a position that does not correlate with a quantity of fish in the livewell 250. For example, if there are five fish in the livewell, then the new position of the color may be something other than one through five (e.g., six, seven, or eight). In a further aspect, the new position may be changed or updated to the last position.

Turning now to FIGS. 3, 4, 5, and 6, methods 300, 400, 500, and 600 are depicted in accordance with an aspect of the invention. The steps in methods 300, 400, 500, and 600 may comprise at least one computer process performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, methods 300, 400, 500, and 600 may be described, by way of example, with respect to the system(s) of FIGS. 1 and 2. However, these methods may additionally or alternatively be executed by any one system, or any combination of systems, including, but not limited to, those described herein.

Figure 3:
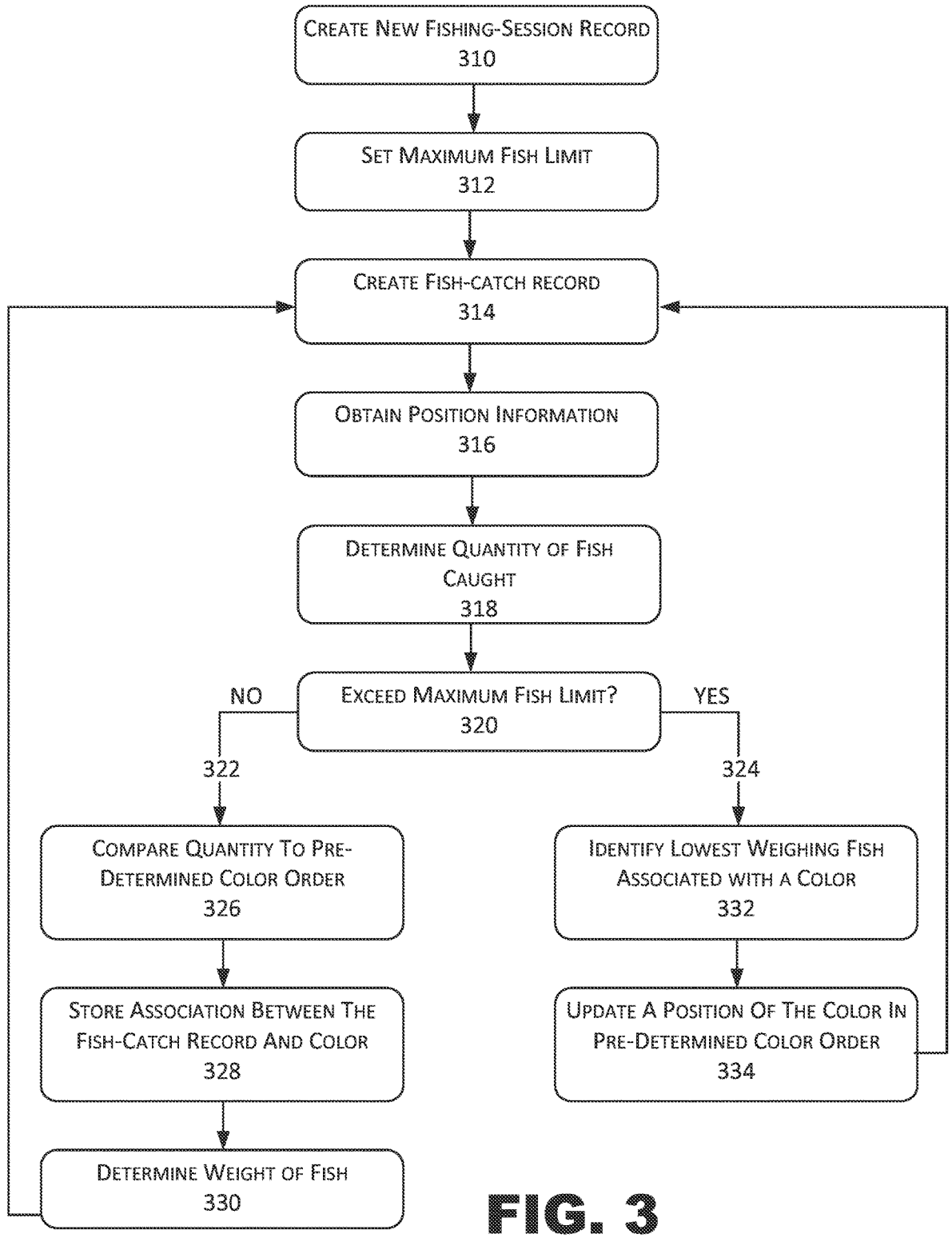
FIG. 3 is a flow diagram showing steps that may be executed when performing a method for tagging and culling fish, in accordance with some embodiments of the present disclosure.

In FIG. 3, the method 300 includes, at step 310, creating a new fishing-session record. For example, the fishing-session manager 226 may store various data representing conditions and information relevant to a new fishing-session event (e.g., date, time, location, lake, etc.) that is received from accessible data sources, input by an angler (e.g., through I/O 224 when prompted), or any combination thereof. In one aspect, the fishing-session manager 226 may create a new fishing-session record in response to receiving various input. For example, the fishing-session manager 226 may create a new fishing-session record when the tagging and culling system 210 is turned on. In other instances, the fishing-session manager 226 may create a new fishing-session record when an angler uses GUI options to request creation of a new fishing-session record.

The method 300 includes, at step 312, setting a maximum fish limit. For example, the maximum fish quantity control 228 may prompt the angler to input (e.g., using the I/O 224) a maximum quantity of fish related to the fishing-session event (e.g., tournament limit or permit limit).

The method 300 includes, at step 314, creating a fish-catch record. For example, the catch-record creator 212 may create a fish-catch record 214 when receiving an input (e.g., from an angler via the I/O 224 or from the weight determiner) indicating that a fish was caught. The input may be provided to the fish-culling system 210 in various manners. For example, the input may be received when a button is pressed on a graphical user interface (e.g., "new catch" button). In other instances, the input may be received when the fish-weight determiner 220 is activated, such as when an angler suspends the fish from the fish-culling system 210 or when a fish is set of a weighing surface. That is, creation of a fish-catch record 214 by the catch-record creator 212 may be automatically triggered when the fish-weight determiner 220 determines a weight value.

The method 300 includes, at step 316, obtaining position information (e.g., GPS data) from a position determiner (e.g., GPS sensor). For example, the catch-record creator 212 may send a request for information from the position determiner 222 in reply to the fish-catch record being created and update the fish-catch record to include the position information. Because the position determiner 222 is integral (e.g., via hard, wired connection in the same device) within the system 210, the position information may be more reliably obtained and near simultaneously with the catch. In addition, synchronization and compilation of the information stored together in the fish-catch record is not dependent on other discrete devices or wireless connection (e.g., Bluetooth, Wi-Fi, cellular, etc.) which may be subject to failure. Furthermore, it reduces the number of devices that must be operated, which streamlines activities in a timed event (e.g., fishing tournament) and creates efficiencies and contributes to ease of use.

The method 300 includes, at step 318, determining a quantity of fish caught during the fishing session. For example, the record counter 230 may update a first data value representing a first quantity (e.g., n) to a second data value representing a second quantity (e.g., n+1).

The method 300 includes, at step 320, determining whether the quantity of fish caught during the fishing session exceeds the maximum cull limit. For example, the fishing-session manager 226 may compare the second data value created during step 316 to the maximum cull limit maintained by the maximum fish quantity control 228. If the quantity of fish does not exceed the maximum cull limit, then the process may proceed along path 322, and if the quantity does exceed the maximum cull limit, then the process may proceed along path 324.

The method 300 includes, along path 322 and at step 326, comparing the quantity of fish caught in the fishing session as a result of the new fish-catch record to a pre-determined color order. For example, the quantity reflected in the record counter may be compared to the colors 236, 238, 240, and 242 to see which color corresponds with the quantity. That is, the tag-color manager 218 may match the quantity to a position of a color and transmit data representing the color to the catch-record creator 212 and/or the fishing-session manager 226.

The method 300 includes, at step 328, storing an association between the fish-catch record and the color. For example, the catch-record creator 212, the fishing-session manager 226, or both, may store an association. In one instance, the catch-record creator 212 may store the association as part of the fish-catch record, and the fishing-session manager 226 may store an association as part of information (e.g., livewell color list 246) presented via the I/O 224. In one aspect, the system 210 presents an instruction or suggestion to the angler to tag the fish with a cull tag having the color.

The method 300 includes, at step 330, determining a weight of the fish. For example, the fish may be suspended from the system 210 or positioned on a surface to allow the weight determiner 220 (e.g., load cell and/or strain gauge) to determine a weight. The catch-record creator 212, the fishing-session manager 226, or both may obtain the weight from the weight determiner and store it in association with the fish-catch record. For example, the catch-record creator 212 may store the association as part of the fish-catch record, and the fishing-session manager 226 may store an association as part of information presented via the I/O 224 and among a list of fish (e.g., livewell color list 246) associated with the fishing session. The process may then start back at step 314 when a new fish is caught. Although the operations of step 330 are depicted and described sequentially after step 328, the operations of step 330 may be executed any time after step 312 and before and/or in parallel with the other steps. For example, the operations of determining a weight of a fish may alternatively be executed right before step 314 and trigger the creation of the fish-catch record. In another instance, the operations of determining a weigh of the fish may be executed in parallel with step 316, 320, 326, or 328.

The method 300 includes, along path 324 and at step 332, identifying, from fish-catch records grouped in a fishing session (including the new record created at step 314), a second fish-catch record associated with a fish-weight value lowest from among the fish-catch records, the second fish-catch record being associated with a color (e.g., as a prior execution of step 328). For example, the system 210 may automatically sort all the fish-catch records associated with a fishing session by weight (as measured by the weight determiner 220) to identify the fish-catch record associated with the lowest weight.

The method 300 includes, at step 334, updating a position of the color in the pre-determined color order. For example, the tag-color manager 218 may move a position of the color to a last position. The process may then start back at step 314 when a new fish is caught.

Figure 4:
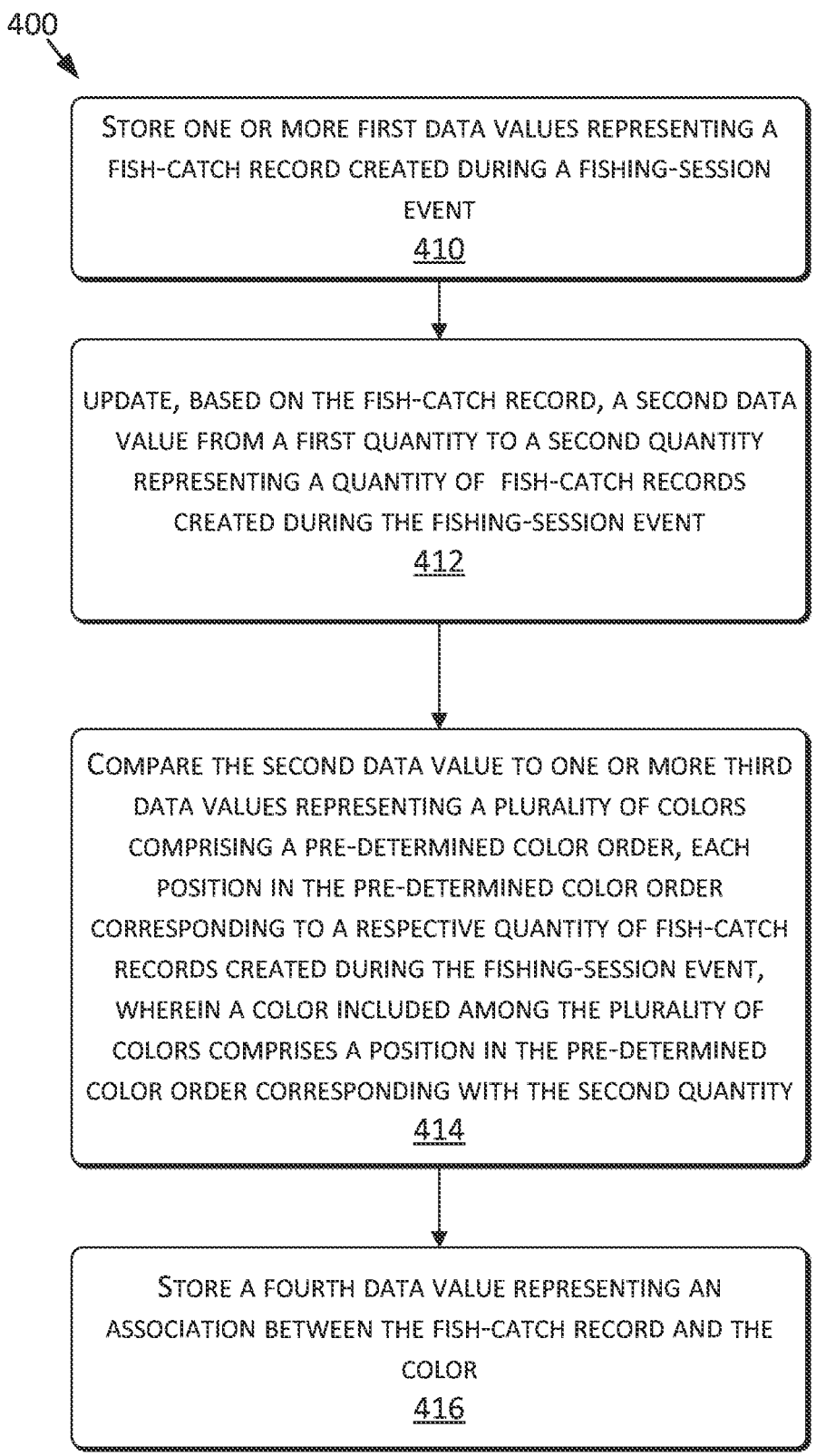
FIG. 4 is a flow diagram showing steps that may be executed when performing a method for tagging a fish, in accordance with some embodiments of the present disclosure.

In FIG. 4, the method 400 includes, at step 410, storing one or more first data values representing a fish-catch record created during a fishing-session event. For example, the catch-record creator 212 may store one or more data values representing the fish-catch record 214 (e.g., unique record identifier, time, GPS data, weight, etc.).

The method includes, at step 412, updating, based on the fish-catch record, a second data value from a first quantity to a second quantity representing a quantity of fish-catch records created during the fishing-session event. For example, the record counter 230 may update a count from a first quantity (e.g., "n") to a second quantity (e.g., "n+1").

The method includes, at step 414, comparing the second data value to one or more third data values representing a plurality of colors comprising a pre-determined color order, each position in the pre-determined color order corresponding to a respective quantity of fish-catch records created during the fishing-session event, wherein a color included among the plurality of colors comprises a position in the pre-determined color order corresponding with the second quantity. For example, the tag-color manager 218 may compare the second data value to a pre-determined color order 232 to match the value of the second quantity to a position of a color in the color order. The color may then be suggested for tagging the fish associated with the fish-catch order.

The method includes, at step 416, storing a fourth data value representing an association between the fish-catch record and the color. For example, the catch-record creator 212 may store data representing the color as part of the fish-catch record 214.

Figure 5:
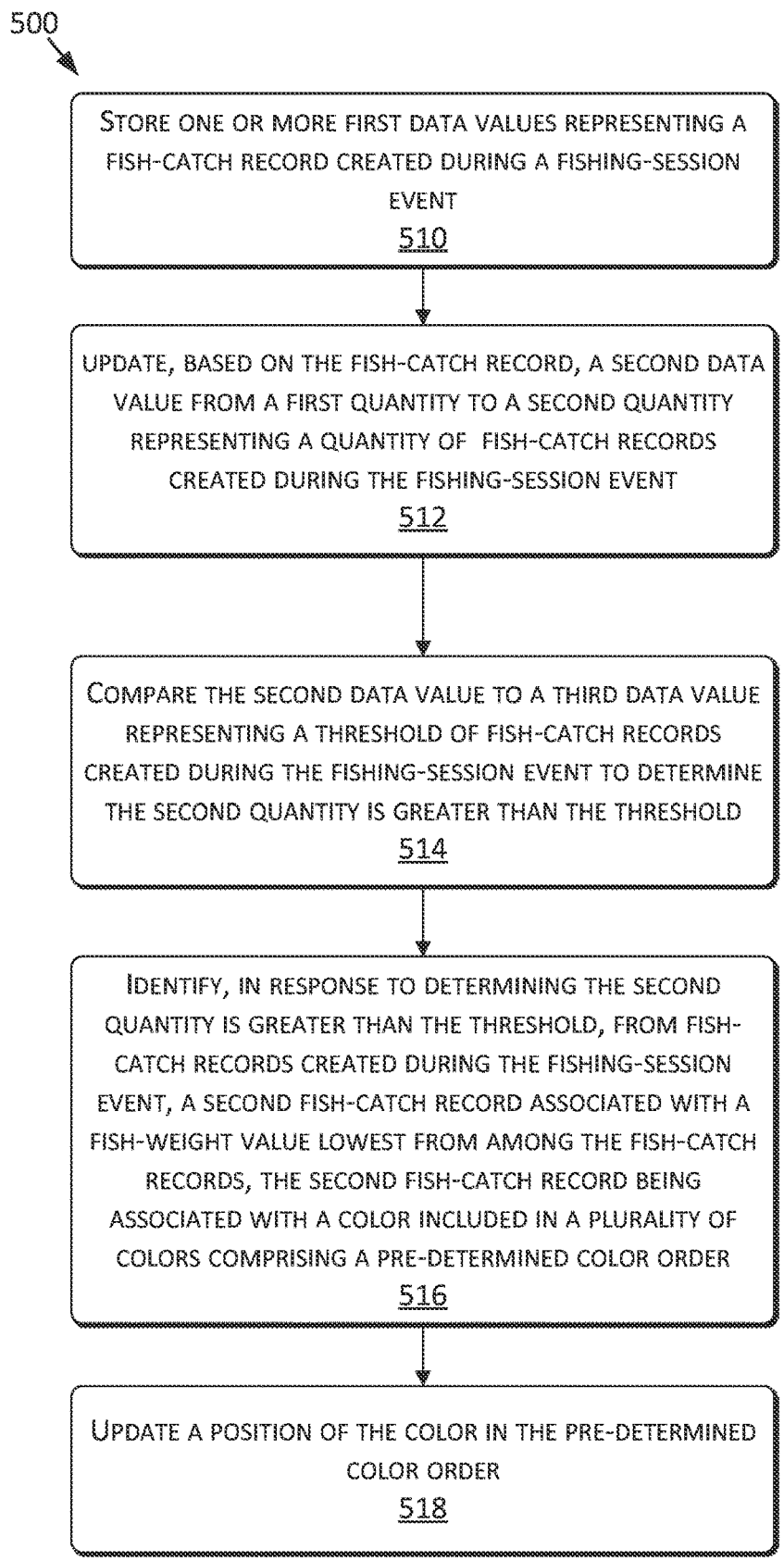
FIG. 5 is a flow diagram showing steps that may be executed when performing a method for updating a color order, in accordance with some embodiments of the present disclosure.

In FIG. 5, the method 500 includes, at step 510, storing one or more first data values representing a fish-catch record created during a fishing-session event. For example, the catch-record creator 212 may store one or more data values representing the fish-catch record 214 (e.g., unique record identifier, time, GPS data, weight, etc.).

The method 500 includes, at step 512, updating, based on the fish-catch record, a second data value from a first quantity to a second quantity representing a quantity of fish-catch records created during the fishing-session event. For example, the record counter 230 may update a count from a first quantity (e.g., "n") to a second quantity (e.g., "n+1").

The method 500 includes, at step 514, comparing the second data value to a third data value representing a maximum fish limit to determine the second quantity is greater than the maximum fish limit. For example, the second data value maintained by the record counter 230 may be compared to the maximum fish limit maintained by the maximum fish quantity control to determine the threshold has been exceeded.

The method 500 includes, at step 516, in response to determining the second quantity is greater than the threshold, identifying, from fish-catch records created during the fishing-session event, a second fish-catch record associated with a fish-weight value lowest from among the fish-catch records, the second fish-catch record being associated with a color included in a plurality of colors comprising a pre-determined color order. For example, the fishing-session manager 226 may identify, from among fish-catch records associated with a fishing-session record, a fish-catch record associated with a lowest weight and with a color.

The method 500 includes, at step 518, updating a position of the color in the pre-determined color order. For example, the tag-color manager 218 may update a position of the color in the color order 232 (e.g., move the color to the last position).

Figure 6:
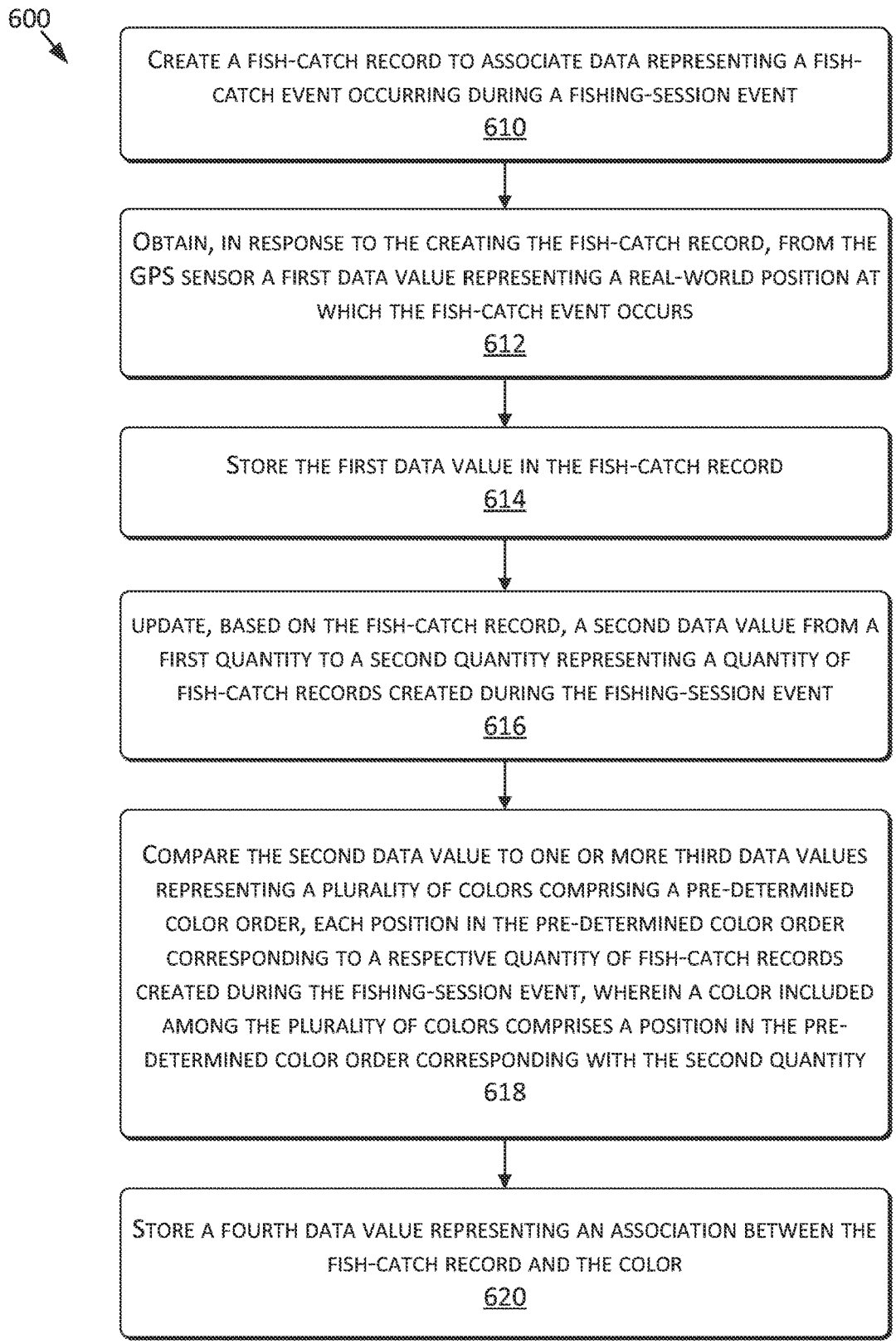
FIG. 6 is a flow diagram showing steps that may be executed when performing a method for determining position data associated with a catch and tagging a fish, in accordance with some embodiments of the present disclosure.

Turning to FIG. 6, the method 600 includes, at step 610, creating a fish-catch record to associate data representing a fish-catch event occurring during a fishing-session event. For example, the catch-record creator 212 may create the fish-catch record 214 to associate various data representing a fish-catch event (e.g., unique record identifier, time, GPS data, weight, etc.).

The method 600 includes, at step 612, in response to the creating the fish-catch record, obtaining from the GPS sensor a first data value representing a real-world position at which the fish-catch event occurs. For example, the creating the fish-catch record 214 may trigger obtaining GPS data from the position determiner 222 (e.g., GPS sensor). Among other things, the GPS data may be used to subsequently pull additional information that may be relevant to the fish-catch event or the fishing-session event, such as temperature, wind speed, wind direction, atmospheric pressure, cloud conditions, humidity, etc.

The method 600 includes, at step 614, storing in the fish-catch record the first data value. For example, the catch-record creator 212 may store the first data value as part of the fish-catch record.

The method 600 includes, at step 616, updating, based on the fish-catch record, a second data value from a first quantity to a second quantity representing a quantity of fish-catch records created during the fishing-session event. For example, the record counter 230 may update a count from a first quantity (e.g., "n") to a second quantity (e.g., "n+1").

The method 600 includes, at step 618, comparing the second data value to one or more third data values representing a plurality of colors comprising a pre-determined color order, each position in the pre-determined color order corresponding to a respective quantity of fish-catch records created during the fishing-session event, wherein a color included among the plurality of colors comprises a position in the pre-determined color order corresponding with the second quantity. For example, the tag-color manager 218 may compare the second data value to a pre-determined color order 232 to match the value of the second quantity to a position of a color in the color order. The color may then be suggested for tagging the fish associated with the fish-catch order.

The method 600 includes, at step 620, storing a fourth data value representing an association between the fish-catch record and the color. For example, the catch-record creator 212 may store data representing the color as part of the fish-catch record 214.

Figure 7:
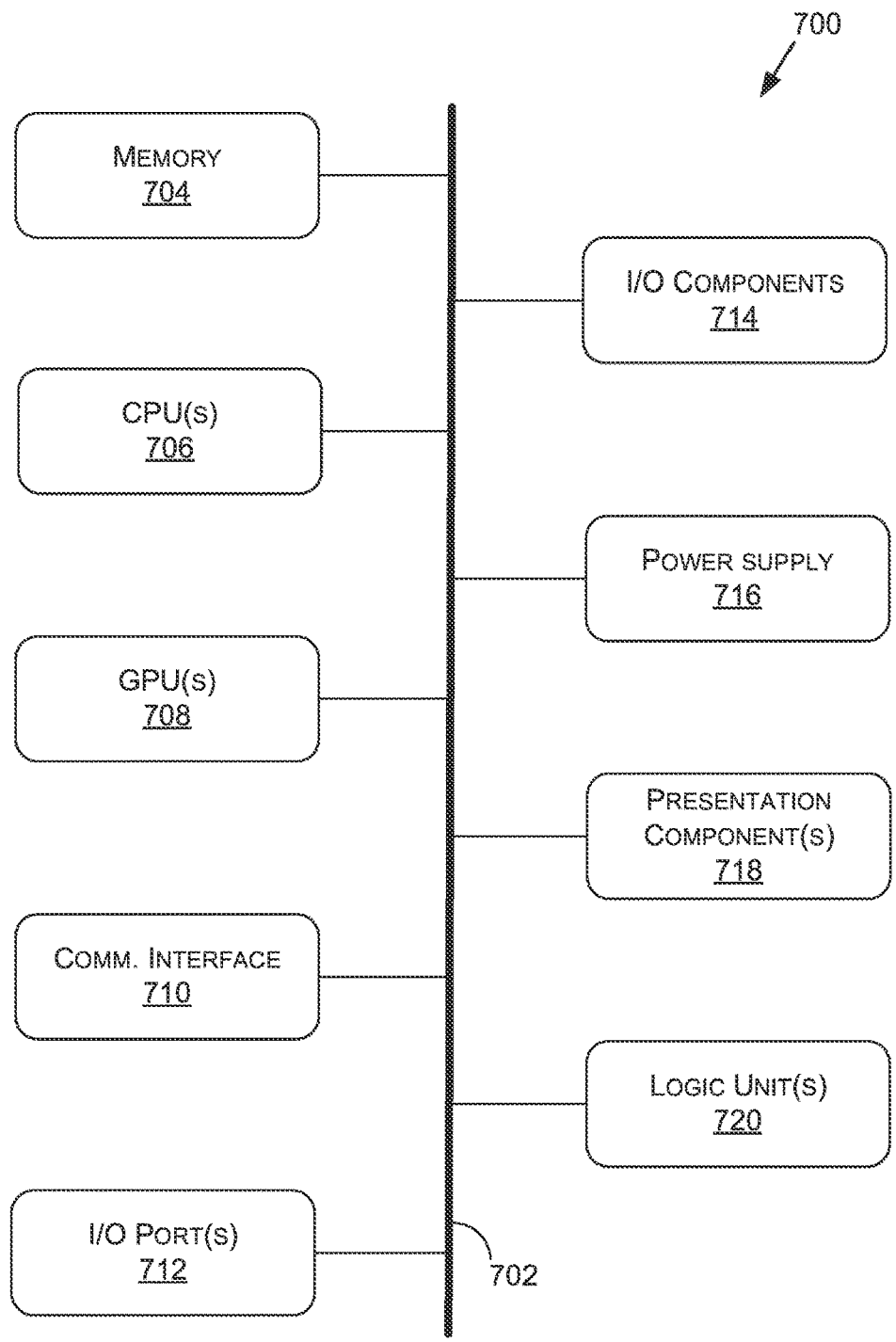
FIG. 7 is an illustration of an example computing device in accordance with some embodiments of the present disclosure.

FIG. 7 is a block diagram of an example computing device(s) 700 suitable for use in implementing some embodiments of the present disclosure. For example, the system 110 and the system 210 may be a computing device having at least some, and possibly all of the elements described with respect to FIG. 7. Computing device 700 may include an interconnect system 702 that directly or indirectly couples the following devices: memory 704, one or more central processing units (CPUs) 706, one or more graphics processing units (GPUs) 708, a communication interface 710, input/output (I/O) ports 712, input/output components 714, a power supply 716, one or more presentation components 718 (e.g., display(s)), and one or more logic units 720.

Although the various blocks of FIG. 7 are shown as connected via the interconnect system 702 with lines, this is not intended to be limiting and is for clarity only. For example, in some embodiments, a presentation component 718, such as a display device, may be considered an I/O component 714 (e.g., if the display is a touch screen). As another example, the CPUs 706 and/or GPUs 708 may include memory (e.g., the memory 704 may be representative of a storage device in addition to the memory of the GPUs 708, the CPUs 706, and/or other components). In other words, the computing device of FIG. 7 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 7.

The interconnect system 702 may represent one or more links or busses, such as an address bus, a data bus, a control bus, or a combination thereof. The interconnect system 702 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 706 may be directly connected to the memory 704. Further, the CPU 706 may be directly connected to the GPU 708. Where there is direct, or point-to-point connection between components, the interconnect system 702 may include a PCIe link to carry out the connection. In these examples, a PCI bus need not be included in the computing device 700.

The memory 704 may include any of a variety of computer-readable media. The computer-readable media may be any available media that may be accessed by the computing device 700. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 704 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 700. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 706 may be configured to execute at least some of the computer-readable instructions to control one or more components of the computing device 700 to perform one or more of the methods (e.g., 300, 400, 500, and 600) and/or processes described herein. The CPU(s) 706 may each include one or more cores (e.g., one, two, four, eight, twenty-eight, seventy-two, etc.) that are capable of handling a multitude of software threads simultaneously. The CPU(s) 706 may include any type of processor, and may include different types of processors depending on the type of computing device 700 implemented (e.g., processors with fewer cores for mobile devices and processors with more cores for servers).

In addition to or alternatively from the CPU(s) 706, the GPU(s) 708 may be configured to execute at least some of the computer-readable instructions to control one or more components of the computing device 700 to perform one or more of the methods and/or processes described herein. One or more of the GPU(s) 708 may be an integrated GPU (e.g., with one or more of the CPU(s) 706 and/or one or more of the GPU(s) 708 may be a discrete GPU. In embodiments, one or more of the GPU(s) 708 may be a coprocessor of one or more of the CPU(s) 706. The GPU(s) 708 may be used by the computing device 700 to render graphics (e.g., 3D graphics) or perform general purpose computations. For example, the GPU(s) 708 may be used for General-Purpose computing on GPUs (GPGPU). The GPU(s) 708 may include hundreds or thousands of cores that are capable of handling hundreds or thousands of software threads simultaneously.

In addition to or alternatively from the CPU(s) 706 and/or the GPU(s) 708, the logic unit(s) 720 may be configured to execute at least some of the computer-readable instructions to control one or more components of the computing device 700 to perform one or more of the methods and/or processes described herein. In embodiments, the CPU(s) 706, the GPU(s) 708, and/or the logic unit(s) 720 may discretely or jointly perform any combination of the methods, processes and/or portions thereof. One or more of the logic units 720 may be part of and/or integrated in one or more of the CPU(s) 706 and/or the GPU(s) 708 and/or one or more of the logic units 720 may be discrete components or otherwise external to the CPU(s) 706 and/or the GPU(s) 708. In embodiments, one or more of the logic units 720 may be a coprocessor of one or more of the CPU(s) 706 and/or one or more of the GPU(s) 708.

The communication interface 710 may include one or more receivers, transmitters, and/or transceivers that enable the computing device 700 to communicate with other computing devices via an electronic communication network, included wired and/or wireless communications. The communication interface 710 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet.

The I/O ports 712 may enable the computing device 700 to be logically coupled to other devices including the I/O components 714, the presentation component(s) 718, and/or other components, some of which may be built in to (e.g., integrated in) the computing device 700. Illustrative I/O components 714 include a microphone, mouse, keyboard, joystick, game pad, game controller, satellite dish, scanner, printer, wireless device, etc. The I/O components 714 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 700. The computing device 700 may be include depth cameras, such as stereoscopic camera systems, infrared camera systems, RGB camera systems, touchscreen technology, and combinations of these, for gesture detection and recognition. Additionally, the computing device 700 may include accelerometers or gyroscopes (e.g., as part of an inertia measurement unit (IMU)) that enable detection of motion. In some examples, the output of the accelerometers or gyroscopes may be used by the computing device 700 to render immersive augmented reality or virtual reality.

The power supply 716 may include a hard-wired power supply, a battery power supply, or a combination thereof. The power supply 716 may provide power to the computing device 700 to enable the components of the computing device 700 to operate.

The presentation component(s) 718 may include a display (e.g., a monitor, a touch screen, a television screen, a heads-up-display (HUD), other display types, or a combination thereof), speakers, and/or other presentation components. The presentation component(s) 718 may receive data from other components (e.g., the GPU(s) 708, the CPU(s) 706, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

The invention claimed is:

1. A scale and cull-tag system for weighing a fish and indicating a color of an unused cull tag to be assigned to the fish, the scale and cull-tag system comprising:
   the unused cull tag;
   a scale housing;
   a GPS sensor contained in the scale housing;
   a fish retainer coupled with the scale housing and configured to retain the fish while a weight of the fish is determined;
   a fish-weight determiner that includes a strain gauge or a load cell, that is coupled to the fish retainer, and that is configured to determine the weight a weight of the fish;
   a display screen integrated into the scale housing and configured to present information related to the fish;
   one or more processing units; and
   one or more memory devices storing instructions thereon that, when executed using the one or more processing units, cause the one or more processing units to execute operations comprising:
      storing one or more first data values representing a fish-catch record created during a fishing-session event;
      updating, based on the fish-catch record, a second data value from a first quantity to a second quantity representing a quantity of fish-catch records created during the fishing-session event;
      comparing the second data value to one or more third data values representing a plurality of colors comprising a pre-determined color order, each position in the pre-determined color order corresponding to a respective quantity of fish-catch records created during the fishing-session event, wherein the color included among the plurality of colors comprises a position in the pre-determined color order corresponding with the second quantity;
      presenting, on the display screen, a visual indication associated with the color indicating a cull-tag color of the unused cull tag;
      storing a fourth data value representing an association between the fish-catch record and the color;
      determining, via the fish-weight determiner, the weight of the fish;
      obtaining, from the GPS sensor and after the weight of the fish is determined, GPS data that represents a location of the scale housing when the weight of the fish is determined;
      storing, in association with the fish-catch record, a fifth data value representing the GPS data and the weight; and
      presenting, on the display screen a visual indication associated with the weight in combination with the color.

2. The scale and cull-tag system of claim 1, wherein the updating the second data value includes incrementing a record counter that initiates filtering fish-catch records created during the fishing-session event when a customizable threshold is met to identify at least one fish-catch record associated with a lowest fish weight.

3. The scale and cull-tag system of claim 2, wherein the second quantity is greater than zero and equal to or less than the customizable threshold.

4. The scale and cull-tag system of claim 1 further comprising,
   determining the second quantity exceeds a threshold of fish-catch records created during the fishing-session event;
   identifying, from fish-catch records created during the fishing-session event, a second fish-catch record associated with a fish-weight value lowest from among the fish-catch records created during the fishing-session event, the second fish-catch record being associated with another color included among the plurality of colors; and
   updating a position of the another color in the pre-determined color order.

5. The scale and cull-tag system of claim 1, wherein the GPS data is obtained simultaneously with the weight of the fish being determined by the fish-weight determiner.

6. The scale and cull-tag system of claim 1 further comprising,
   determining a fish-weight value associated with the fish-catch record is lowest from among fish-catch records crated during the fishing-session event, the fish-catch records including at least a second fish-catch record associated with another color included among the plurality of colors;
   in response to one or more user-provided inputs, changing a status of the second fish-catch record; and
   updating a position of the another color in the pre-determined color order.

7. The scale and cull-tag system of claim 1, wherein the visual indication associated with the color is presented on the display screen prior to the unused cull tag being selected for attachment to the fish.

8. The scale and cull-tag system of claim 1, wherein the fish retainer comprises a gripping mechanism or a surface that supports the fish while the weight is determined.

* * * * *